(12) United States Patent
Bari et al.

(10) Patent No.: US 12,712,826 B2
(45) Date of Patent: Aug. 18, 2026

(54) MACHINE LEARNING APPROACHES FOR PROVISIONING TELECOMMUNICATIONS SERVICES

(71) Applicant: T-Mobile USA, Inc., Bellevue, WA (US)

(72) Inventors: Mohammad Mustafa Bari, Woodinville, WA (US); Lema Kandula, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 46 days.

(21) Appl. No.: 19/012,472

(22) Filed: Jan. 7, 2025

(65) Prior Publication Data

US 2026/0197283 A1 Jul. 9, 2026

(51) Int. Cl.
*H04L 47/83* (2022.01)
*G06N 20/00* (2019.01)

(52) U.S. Cl.
CPC ............. *H04L 47/83* (2022.05); *G06N 20/00* (2019.01)

(58) Field of Classification Search
CPC ................................ H04L 47/83; G06N 20/00
See application file for complete search history.

(56) References Cited

U.S. PATENT DOCUMENTS 7,006,979 B1 2/2006 Samra et al.
7,010,495 B1 3/2006 Samra et al.
7,305,364 B2 12/2007 Nabe et al.
7,917,383 B2 3/2011 Maga et al.
8,271,313 B2 9/2012 Williams et al.
8,504,408 B2 8/2013 Banthia et al.
10,997,662 B1 5/2021 Warfel et al.
11,107,084 B2 8/2021 Karmakar et al.
11,157,926 B2 10/2021 Guan et al.
11,201,963 B2 12/2021 French et al.
11,321,762 B2 5/2022 Subramanian et al.
11,481,685 B2 * 10/2022 Chawla ............... H04M 3/5232

(Continued)

FOREIGN PATENT DOCUMENTS

CN 109767791 B 3/2021
CN 110390408 B 3/2024

(Continued)

*Primary Examiner* — Abdelbasst Talioua
(74) *Attorney, Agent, or Firm* — Perkins Coie LLP

(57) ABSTRACT

A computer system receives diverse telecommunications network data including experience metrics or satisfaction scores from multiple sources across a network. The raw data contains inherent imbalances where positive adoption cases represent less than a small fraction of the total cases across service categories. The computer system processes this imbalanced data using under-sampling to create balanced datasets, then performs feature engineering to extract features such as voice band size into weighted feature vectors. The engineered features are used to train specialized AI models that generate propensity scores indicating service adoption likelihood for different telecommunications services. The computer system determines lift scores by comparing the propensity-based predictions against baseline response rates to validate accuracy. When lift scores exceed a threshold, indicating better-than-random prediction accuracy, the corresponding services are identified and provisioned for user devices.

12 Claims, 6 Drawing Sheets

(56) References Cited

U.S. PATENT DOCUMENTS

| | | | | |
|---|---|---|---|---|
| 11,599,895 | B2 | 3/2023 | Sinha et al. | |
| 11,715,130 | B2 | 8/2023 | Perge et al. | |
| 11,743,237 | B2 | 8/2023 | Fiumara et al. | |
| 11,804,302 | B2 | 10/2023 | Fahner et al. | |
| 11,966,953 | B1 * | 4/2024 | Peshwe | G06N 3/08 |
| 12,033,188 | B2 | 7/2024 | Kandath et al. | |
| 2004/0215501 | A1 | 10/2004 | d'Ornano | |
| 2006/0122857 | A1 | 6/2006 | Decotiis et al. | |
| 2006/0143071 | A1 | 6/2006 | Hofmann | |
| 2007/0094066 | A1 | 4/2007 | Kumar et al. | |
| 2007/0112614 | A1 | 5/2007 | Maga et al. | |
| 2009/0157476 | A1 | 6/2009 | Itani et al. | |
| 2011/0047072 | A1 | 2/2011 | Ciurea | |
| 2012/0130771 | A1 | 5/2012 | Kannan et al. | |
| 2017/0300948 | A1 | 10/2017 | Chauhan et al. | |
| 2019/0121867 | A1 * | 4/2019 | Misra | G06F 16/24578 |
| 2022/0405775 | A1 | 12/2022 | Siebel et al. | |
| 2023/0298058 | A1 | 9/2023 | Woytarowicz et al. | |
| 2023/0376977 | A1 | 11/2023 | Yao et al. | |
| 2025/0008346 | A1 * | 1/2025 | Singh | H04W 24/02 |
| 2025/0317364 | A1 * | 10/2025 | Song | H04L 41/16 |
| 2025/0335742 | A1 * | 10/2025 | Cheng | G06N 3/0455 |

FOREIGN PATENT DOCUMENTS

| | | | | |
|---|---|---|---|---|
| EP | 1625481 | A2 | 2/2006 | |
| EP | 1785930 | A1 | 5/2007 | |
| EP | 1785931 | A1 | 5/2007 | |
| EP | 1811445 | A1 | 7/2007 | |
| EP | 1949271 | A2 | 7/2008 | |
| EP | 2606459 | A2 | 6/2013 | |
| EP | 3140799 | A1 | 3/2017 | |
| EP | 4030684 | A1 | 7/2022 | |
| EP | 4346262 | A1 * | 4/2024 | H04W 24/02 |
| JP | 5104496 | B2 | 10/2012 | |
| KR | 102428405 | B1 | 8/2022 | |
| KR | 102478104 | B1 | 12/2022 | |
| KR | 102556324 | B1 | 7/2023 | |
| KR | 102664008 | B1 | 5/2024 | |
| WO | 2005106656 | A2 | 11/2005 | |
| WO | 2014126576 | A2 | 8/2014 | |
| WO | 2019113122 | A1 | 6/2019 | |
| WO | 2019172887 | A1 | 9/2019 | |
| WO | 2020060544 | A1 | 3/2020 | |

* cited by examiner

MACHINE LEARNING APPROACHES FOR PROVISIONING TELECOMMUNICATIONS SERVICES

BACKGROUND

Telecommunications service providers manage user bases with diverse product offerings including voice services, Internet connectivity, Internet of Things (IOT) solutions, and various digital services. These product offerings span multiple categories including voice, high-speed Internet, beyond-the-smartphone devices such as wearables, and security services. Meanwhile, machine learning systems have emerged as a key technology in the telecommunications industry for analyzing data. Machine learning systems can process various types of data including user feedback and network usage patterns. However, conventional approaches to data management that rely on data universal numbering systems often lack internal models that can effectively use transactional data for targeting telecommunications services to user devices.

BRIEF DESCRIPTION OF THE DRAWINGS

Detailed descriptions of implementations of the present technology will be described and explained through the use of the accompanying drawings.

Figure 1:
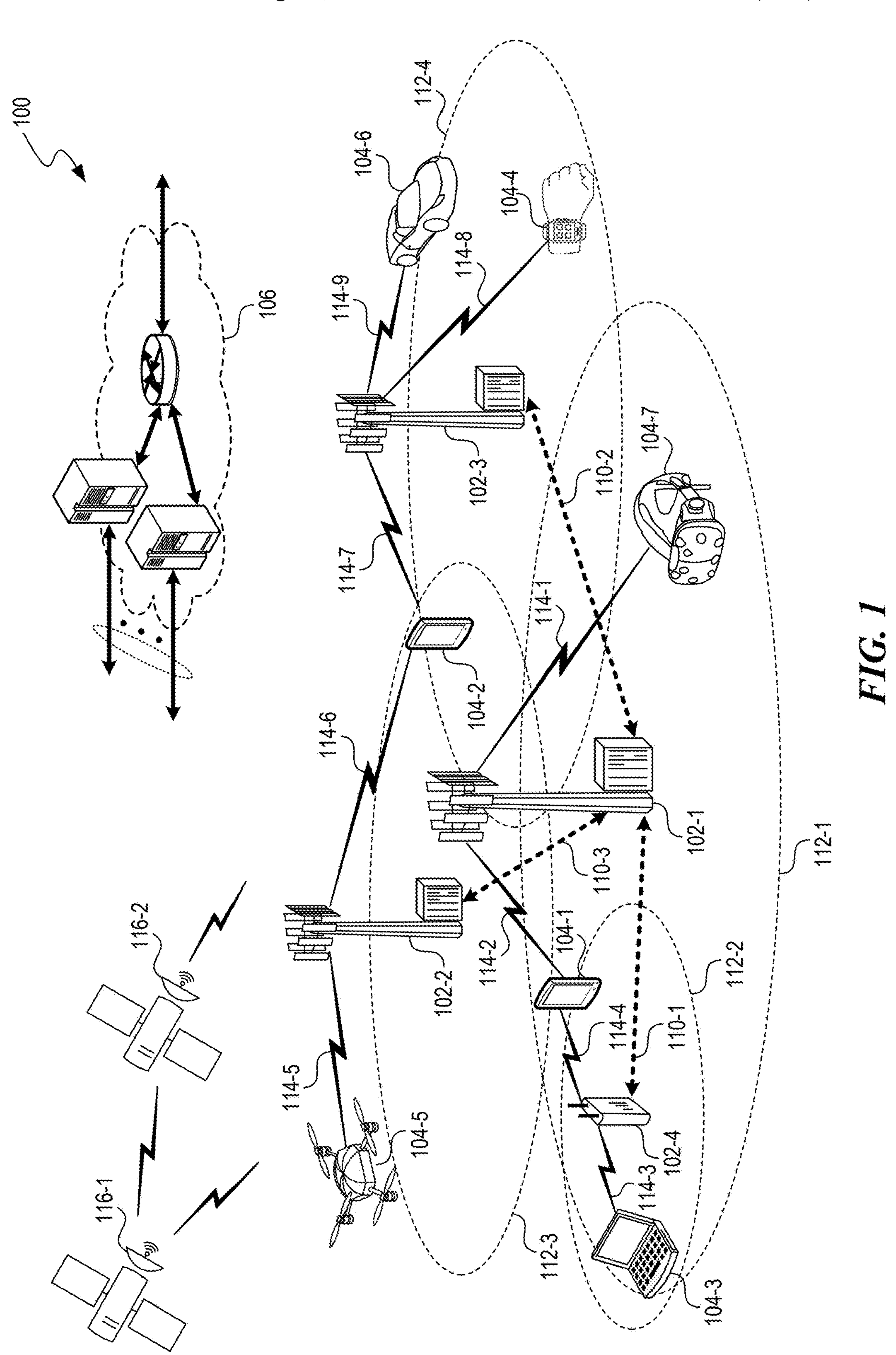
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications providers often manage complex services including voice services, Internet connectivity, Internet of Things (IoT) services, and/or digital services across a telecommunications network. Service providers can collect and analyze extensive datasets including network usage patterns to improve the provided services. However, conventional data analysis methods that rely on data universal numbering systems are typically limited in the amount of data they can analyze and can result in inefficient telecommunications resource allocation. The methods and systems described herein provide more sophisticated machine learning approaches for predicting telecommunications service adoption by users and provisioning telecommunications services to user devices.

The systems and methods described herein apply machine learning models to diverse telecommunications data for predicting telecommunications service adoption rates by different users. Raw data is ingested from multiple sources that provide, for example, network experience metrics and/or network usage patterns. The raw data can include data related to voice services, Internet, beyond-the-smartphone devices, IoT services, fleet services, multiline services, unified communications, and/or security services. The raw data undergoes systematic feature engineering and preprocessing to address inherent data imbalances across different telecommunications services. The processed telecommunications service-specific data is used for feature extraction for specific classification models. The resulting feature vectors are used by trained artificial intelligence (AI) models to generate propensity scores, which are further transformed into actionable decile-based results. The decile-based results can be used to provision telecommunications hardware and/or software services to user devices. The multi-label classification framework disclosed herein generates actionable intelligence for improved telecommunications service delivery and resource allocation.

In some implementations, raw telecommunications network data is transformed into actionable service recommendations. Diverse network data including experience metrics, satisfaction scores, usage patterns, and/or device history information is collected from multiple data sources across the network. The raw data can exhibit data imbalances where positive adoption cases represent only a small proportion of the total analyzed cases across different service categories. The raw data undergoes feature engineering to derive and extract data points reflecting voice band size, network usage patterns, and/or technology utilization metrics. To address the imbalances, experimentation is performed that involves over- and/or under-sampling techniques to create balanced datasets suitable for AI model training and application. These engineered and balanced data points are transformed into weighted feature vectors that capture the predictive importance of different features—for example, the voice band size can represent 23.3% importance while "add-a-line" history can represent 19.4% importance for voice services. The engineered feature vectors are used by multiple specialized classification models, each focused on a specific telecommunications service category. Each AI model generates propensity scores indicating service adoption likelihood by different users. The models' predictions are validated by determining lift scores that compare the propensity scores with baseline response rates. A baseline response rate can be determined by dividing the total number of positive adoption cases (instances where customers add new services) by the total number of cases, establishing a benchmark against which to measure model performance. When the lift scores exceed a threshold score (indicating better-than-random accuracy), the corresponding telecommunications services are identified for provisioning to user devices.

In some instances, periodic AI model improvement is implemented using selective retraining based on the lift scores. Lift scores across all the classification models are analyzed to identify which AI models would benefit from retraining. The AI models showing declining lift scores and/or performance below optimal thresholds can be selected for retraining to maintain prediction accuracy. During the retraining process, AI model parameters such as feature importance weights and correlation thresholds are adjusted. For example, if the voice service model's performance declines, the weights assigned to different features related to voice services can be recalibrated. The retraining process incorporates new network data and network usage patterns while maintaining the under-sampling approach to address data imbalances. The selective retraining approach enables the AI models to periodically improve performance across telecommunications service categories while focusing computational resources on the AI models that would benefit from refinement. The re-trained AI models provide updated propensity scores that improve the provisioning of telecommunications services to user devices.

The benefits and advantages of the implementations described herein include transformation of complex telecommunications network data into feature vectors for improved analysis using trained machine learning models. By ingesting diverse data sources including network experience metrics, usage patterns, and/or technology utilization data, the disclosed systems create more comprehensive feature sets for predictive modeling compared to conventional methods. A key technical advantage of the disclosed systems is their ability to address data imbalances in the vast telecommunications network data using under-sampling. The resulting balanced datasets enable more effective AI model training despite positive cases representing less than a small fraction of the datasets. The balanced datasets and resulting feature vectors are used by multiple specialized classification models that enable improved telecommunications service provisioning compared to traditional methods.

Further, the disclosed AI models are automatically retrained on periodic cycles by periodically transforming new network data into updated feature vectors. The disclosed systems determine feature importance weights to quantify the relative impact of different network features such as voice band size and Internet services, which provides improved provisioning results. Performance evaluation through lift score determination enables objective validation of the AI models' prediction success. The multi-model AI structure disclosed consolidates the improved predictions into actionable service delivery parameters. The disclosed systematic approach to data processing and machine learning creates a scalable solution for improving network resource allocation and service provisioning.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communications networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
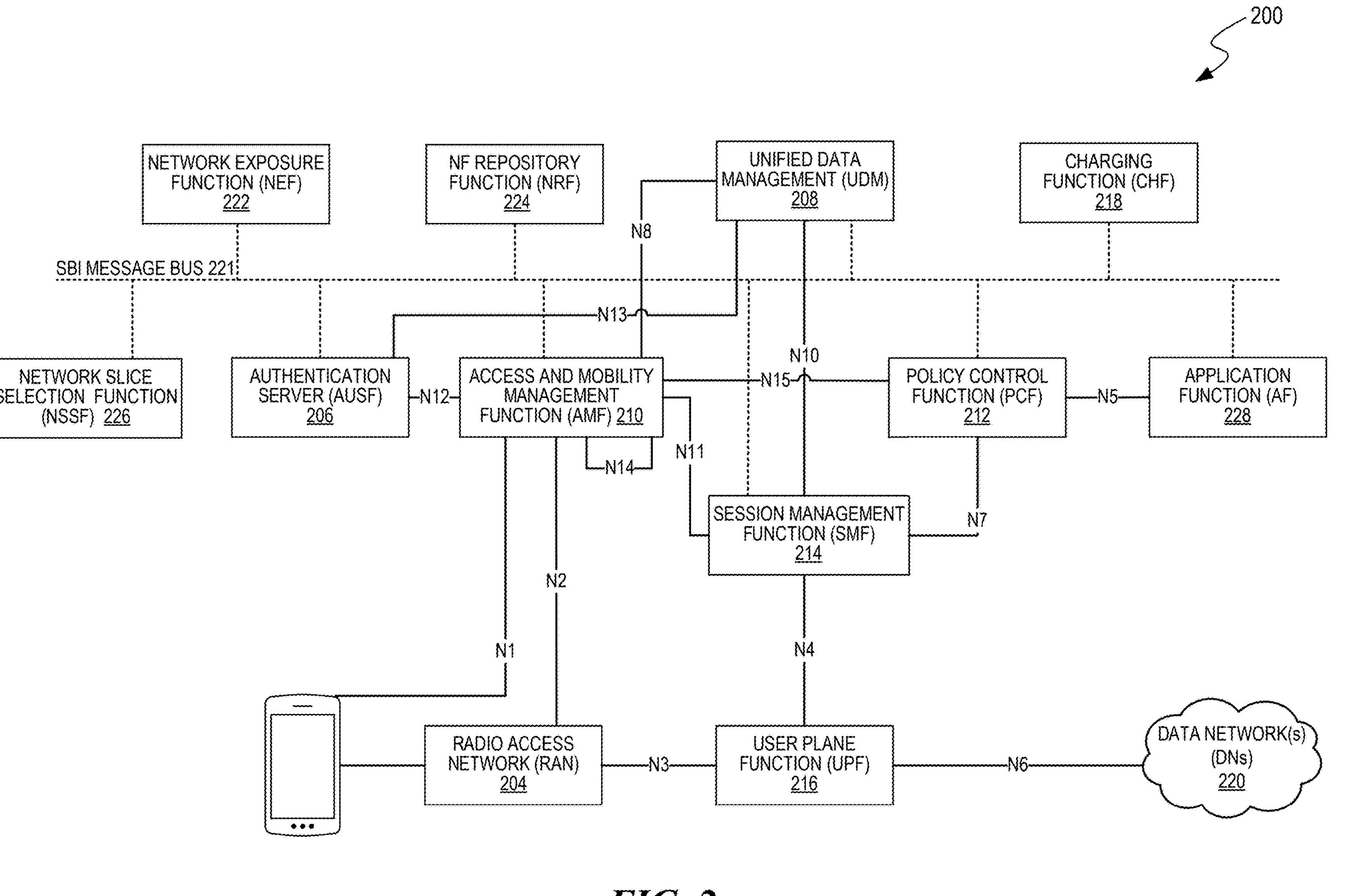
FIG. 2 is a block diagram that illustrates an architecture including 5G core network functions that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Telecommunications Service Provisioning Using Machine Learning

Figure 3:
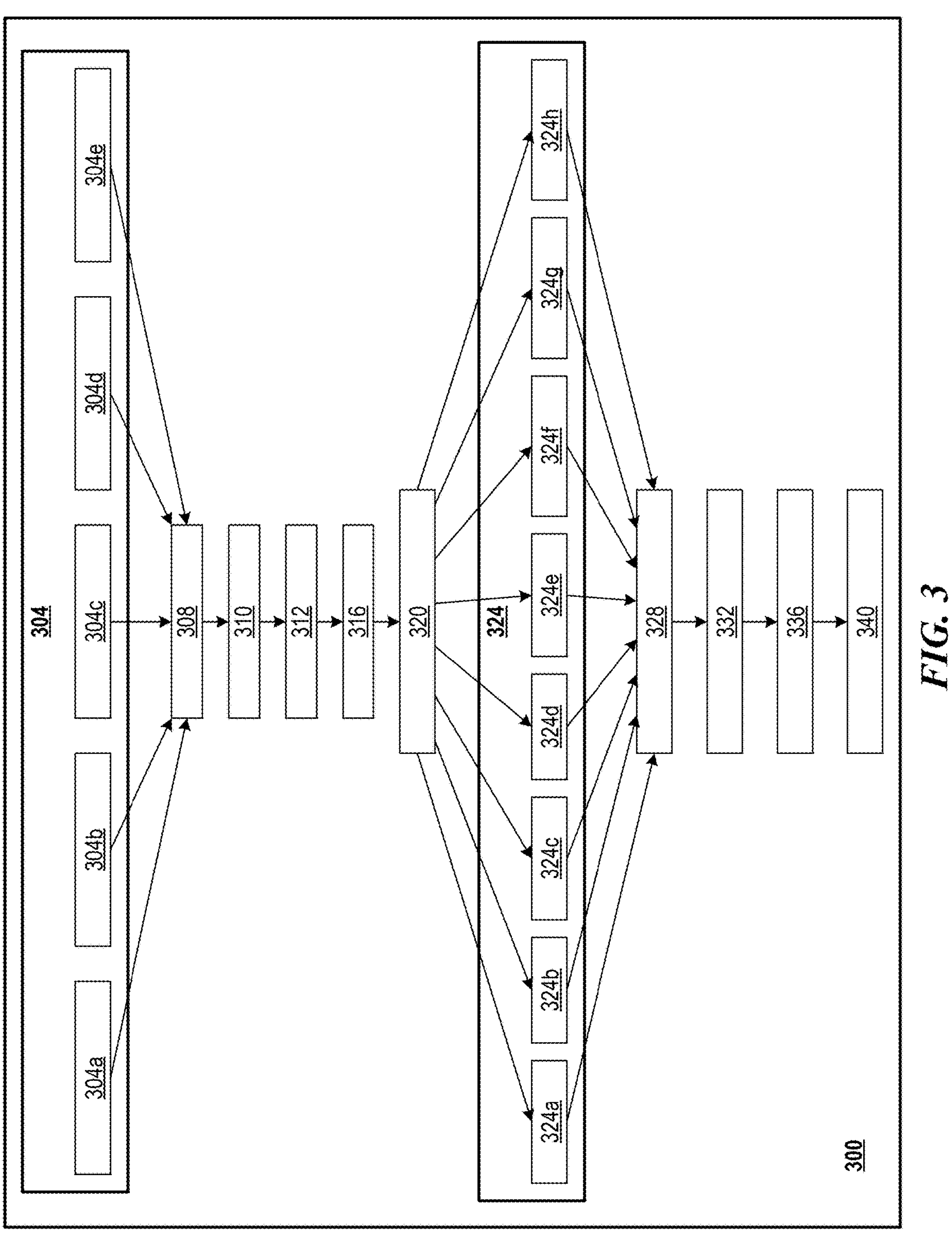
FIG. 3 is a drawing that illustrates an example system that implements machine learning approaches for provisioning telecommunications services.

FIG. 3 is a drawing that illustrates an example system 300 that implements machine learning approaches for predicting telecommunications service adoption. System 300 is communicatively coupled to and receives telecommunications network data from multiple data sources associated with a telecommunications network. The telecommunications network is the same as or similar to the network 100, illustrated and described in more detail with reference to FIG. 1. The multiple data sources include the wireless devices 104-1 through 104-7 and the network functions (NFs) illustrated and described in more detail with reference to FIGS. 1-2. The system 300 includes raw telecommunications network data 304, datasets 308 (combining/arranging the raw telecommunications network data 304), a data processing module 312, a feature engineering module 316, AI algorithm(s) 320, AI models 324, propensity scores 328, an evaluation module 332, lift scores 336, and a provisioning module 340. The system 300 is implemented using components of example computer system 600 illustrated and described in more detail with reference to FIG. 6. Likewise, embodiments of example system 300 can include different and/or additional components or can be connected in different ways.

The system 300 receives raw telecommunications network data 304 from multiple data sources associated with the telecommunications network. The telecommunications network data 304 can include network experience metrics, network usage data, and/or network technology utilization metrics. The telecommunications network data 304 is associated with multiple user devices, which are the same as or similar to the wireless devices 104-1 through 104-7 illustrated and described in more detail with reference to FIG. 1. For example, the received transactional data **304*a* includes billing information, plans and/or devices purchased, device upgrade history, rate plan information, contract renewal data, and/or port in/out information across the telecommunications network. The account information 304*b*** can include account type, tenure, customer segment, number of lines, product mix, credit family, dedicated SDR/Direct expert (DE) assignment, activation and/or deactivation information, and/or location/region data.

The customer feedback metrics **304*c* can include customer satisfaction scores (CSAT), a net promoter score (NPS), and/or network experience (NEX) scores that measure customer satisfaction and network performance. The raw telecommunications network data 304 can include network usage data 304***d*, which includes network-level metrics such as total Megabyte (MB) data usage, average network experience scores, voice/data consumption patterns, and/or technology-specific metrics for LTE/5G networks. MB usage represents the amount of network data consumed across the telecommunications network. The firmographic data 304*e* is related to entity size, type of industry, entity revenue, locations, and/or growth trends such as changes in employee count or regional branch expansion.

The diverse telecommunications network data 304 is combined into datasets 308 associated with different telecommunications services offered across the telecommunications network. For example, the telecommunications services include voice services, Internet services, beyond-the-smartphone devices, Internet of Things (IoT) services, multiline services, unified communications services, and/or security services. When the datasets 308 are created from the raw telecommunications network data 304, the raw telecommunications network data 304 can be spliced, divided, and/or arranged according to the telecommunications services into the datasets 308.

The telecommunications network data 304 can include data imbalances associated with the multiple telecommunications services. The imbalances make their way into the datasets 308. For example, the imbalances can result from positive user adoption cases representing less than a small percentage (e.g., 2%, 3%) across the different product and service categories. The data imbalances result from conditions in the raw telecommunications network data 304 where positive adoption cases (instances where customers add new services) represent less than a small percentage of the total cases, across different product categories. Here, a "case" refers to an instance of service adoption or non-adoption in the telecommunications network data 304. A positive case represents when a customer adds a new service, while a negative case represents when they do not add the service. The datasets 308 have imbalances when for every 100 instances in the data, very few are examples of customers actually adding new services.

The system 300 processes the datasets 308 to derive engineered features. For example, diverse telecommunications network datasets including transactional data, account information, customer feedback metrics, network usage data, and/or firmographic data are processed. The system 300 can perform feature engineering by extracting key data points such as voice band size, network experience metrics, usage patterns, and/or technology utilization data to generate the feature engineered dataset 310. The system 300 uses the data processing module 312 to process the feature engineered dataset 310. The relevant features are engineered and selected, and then a combination of over- and/or under-sampling is performed to adjust the data imbalances and generate processed data (balanced datasets). Over-sampling is a data processing technique that increases the number of positive cases (adoption instances) to create more balanced training datasets. Under-sampling is a data processing technique that reduces the number of negative cases (non-adoption instances) to create more balanced training datasets while preserving the important predictive signals in the feature engineered dataset 310, enabling more effective model training by preventing the AI models 324 from being overwhelmed by the majority class of non-adoption cases. The feature engineering module 316 implements additional data processing and feature engineering to transform the balanced datasets (processed data) into features suitable for the multiple AI models 324. For example, data points are extracted from the processed data to generate multiple feature vectors. Each feature vector can correspond to a respective one of the telecommunications services. Feature extraction and feature vectors are described in more detail with reference to FIG. 5. The data points extracted can include voice band size, network usage patterns, technology utilization metrics, and/or service activation history.

The data point extraction and feature vector generation can be performed by extracting user behavior data, such as "contacts coming to inbound marketing have higher chances of joining the network" or "contacts with nonbusiness email domains join the network at lower rates." The feature engineering module 316 can generate feature vectors by analyzing historical data points and determining the correlation between particular data points and expected results (whether an associated user device joined the network). In some implementations, the feature engineering module 316 normalizes the correlations to a range of 0 to 1 (0 to 100%) by computing absolute values of the correlations and adjusting them so all correlations sum to 100. The feature engineering module 316 ranks the correlations and selects the top correlations that sum up to a predetermined threshold (typically 90 or 95). Data points associated with correlations below this threshold are discarded.

For categorical data types, the feature engineering module 316 performs conversion to numerical values before providing them to the AI algorithm(s) 320 and AI models 324. For example, the feature engineering module 316 processes multiple data points covering network experience metrics, usage patterns, technology utilization data, service activation history, average Megabyte (MB) usage, total MB usage, network experience scores, and/or technology-specific consumption patterns. The feature engineering module 316 can also handle missing data points using a specific protocol. For example, if less than 30% of values are missing for a feature, the feature engineering module 316 generates replacement values using either 0 or the mean of existing values. However, if more than 30% of values are missing for a particular feature, that feature is disregarded entirely and not provided to the AI models 324 to ensure greater reliability and quality of the training data.

The AI algorithm(s) 320 are the same as or similar to the AI algorithm 516 illustrated and described in more detail with reference to FIG. 5. The AI algorithm(s) 320 use the multiple trained AI models 324 to generate multiple propensity scores 328 for the user devices using the feature vectors. For example, each of the trained AI models 324 provides a respective one of the propensity scores 328. A propensity score is a numerical value between 0 and 1 (or 0 to 100) generated by an AI model 324 that indicates the likelihood of a customer adding a particular telecommunications service, where higher scores indicate a greater probability of service adoption.

The architecture shown by FIG. 3 includes multiple specialized AI models 324 (e.g., binary classification models), each dedicated to a specific telecommunications service: voice model 324*a*, Internet model 324*b*, beyond-the-smartphone devices model 324*c*, IoT services model 324*d*, fleet model 324*e*, multiline services model 324*f*, unified communications model 324*g*, and a security model 324*h*. The AI models 324 are the same as or similar to example AI model 530 described with reference to FIG. 5. For example, the voice model 324*a* is trained using feature vectors including voice service-specific parameters and is used to generate propensity scores for adding voice lines. The key features used for training and application of the voice model 324*a* include voice band size (23.3% importance weight), add-a-line history (19.4%), and/or total equipment installment plan (EIP) count.

In some implementations, the feature engineering module 316 generates the feature vectors by determining feature importance weights for features of the telecommunications services. The feature importance weights indicate a relative impact of each feature on the propensity scores 328. An importance weight is a numerical value, e.g., between 0-100 that indicates the relative predictive power of a specific feature. The system 300 can determine normalized feature importance weights that sum to 100% across different features. Different telecommunications services can show distinct feature importance patterns—while voice band size features can be important for voice services, network usage metrics features and other features carry varying weights for other services.

The EIP count can be tracked by metrics such as LAST_MONTH_TOTAL_EIP CNT that counts the number of EIP devices associated with an account. EIP is considered in the voice model's features, with the total EIP count being one of the key predictive features used across multiple service models, particularly for voice services where it can represent 17.4% importance in the feature weights. The system 300 can track both device tenure as well as EIP tenure metrics over a time period as part of the transactional data used for predicting service adoption. The Internet model 324*b* (sometimes referred to as high-speed Internet or HSI model) is used to predict propensity for adding Internet services. Key features used for training and application of this model include an HSI band size, an HSI add-a-line history, and MB usage metrics. The beyond-the-smartphone devices model 324*c* (sometimes referred to as a mobile Internet (MINT) model focuses on wearables, tablets, and connected devices. The key features used for training and application of the beyond-the-smartphone devices model 324*c* include MINT add-a-line history, MINT ban size, and dedicated expert indicators.

The IoT services model 324*d* predicts adoption of IoT solutions. The typical features used for training and application of the IoT services model 324*d* include IoT add-a-line history, rate plan mix, and/or dedicated expert indicators. The fleet model 324*e* predicts adoption of fleet management services such as SyncUP Fleet with GPS tracking capabilities. Key features used for training and application of the fleet model 324*e* include fleet add-a-line history, MINT ban size, and/or total EIP count. The multiline model 324*f* predicts likelihood of businesses managing multiple lines on single devices. Key features used for training and application of the multiline model 324*f* include voice ban size, multiline add-a-line history, and/or MB usage. The unified communications model 324*g* (sometimes referred to as the Dialpad model) focuses on AI-powered workspace solutions. Key features used for training and application of the unified communications model 324*g* include service text indicators, premium service charges, and/or service talk indicators. The security model 324*h* predicts adoption of network security solutions and device management services. Key features used for training and application of the security model 324*h* include port-in indicators, subscriber activations, and/or ban tenure metrics.

The AI models 324 are used to generate normalized propensity scores 328 (e.g., between 0 and 1) for each of the telecommunications services and each user device. For example, a propensity score closer to 1 indicates a higher likelihood of service adoption. When analyzing a customer base of, say 10 million customers, each specialized AI model 324 (e.g., voice, Internet, IoT) provides an individual propensity score for each user or user device. The propensity scores 328 are organized into deciles-ten equal groups ranked from highest to lowest scores. The decile organization enables systematic targeting of specific user and service segments based on their likelihood to adopt particular services. The system 300 automatically refreshes these propensity scores and decile assignments periodically to maintain current predictions based on the latest telecommunications network data 304 and usage patterns.

The system 300 consolidates predictions 332 from the AI models 324 into an integrated framework that transforms complex telecommunications data into actionable service delivery parameters. In some implementations, the evaluation module 332 determines multiple lift scores 336 for the user devices using the propensity scores 328. Each lift score corresponds to a respective one of the telecommunications services. The propensity scores 328 are organized into deciles (10 equal groups) for generation of the lift scores 336 and to enable performance evaluation of the AI models 324, with lift scores 336 determined by comparing predictions against baseline response rates.

A baseline response rate can be determined by dividing the total number of positive adoption cases (instances where customers add new services) by the total number of cases in the datasets 308, establishing a benchmark against which to measure model performance. For example, if less than 2% of cases are positive adoptions, the baseline rate would be 0.02, representing the probability of service adoption by random chance. A lift score is a metric that compares an AI model's predictive performance to a baseline or random chance, determined by dividing the positive count per decile by the product of total count and baseline response rate, where a lift score greater than 1 indicates better-than-random performance. For example, a lift score greater than 1 indicates better-than-random predictive accuracy, with higher scores demonstrating stronger performance. For example, the voice model 324*a* can achieve a lift score of 3.06 in top deciles for small-medium business (SMB) segments.

The Internet model 324*b* can have a performance with lift scores of 7.13 in top deciles for enterprise segments. The beyond-the-smartphone devices model 324*c* can demonstrate lift scores of 7.4 in enterprise segments. The IoT services model 324*d* can achieve lift scores of 9.23 in enterprise segments. The fleet model 324*e* can demonstrate a performance with lift scores of 8.46 in SMB segments. The multiline model 324*f* can achieve lift scores of 10.0 in top deciles. The security model 324*h* achieves lift scores of 6.9 in SMB segments.

The lift scores 336 provide a mechanism for evaluating how the AI models 324 are performing and for validating if the propensity scores 328 generated by the AI models 324 are meaningful predictors of service adoption. The lift scores 336 enable more precise telecommunications service provisioning by identifying which service and user segments and deciles show better-than-random prediction accuracy. For example, knowing that voice models achieve lift scores of 3.06 in top deciles while fleet models show lift scores of 8.46 allows the provisioning module 340 to improve provisioning for different services. In response to one or more of the lift scores 336 exceeding a threshold score, the provisioning module 340 provisions one or more of the telecommunications services for at least one user device. The one or more of the telecommunications services correspond to the one or more of the lift scores that exceed the threshold score.

The lift scores use a threshold performance metric that determines which services should be targeted to which user devices. By identifying where lift scores exceed a threshold score (e.g., 1.0, 10, 100) the provisioning module 340 can focus resources on segments where the predictions are proven to be reliable, rather than provisioning based on propensity scores 328 alone. The lift scores 336 also provide ongoing validation of model performance through periodic refreshes, ensuring the predictions maintain their accuracy over time. Provisioning of services refers to the technical process of targeting users and/or user devices for activating or enabling specific telecommunications services (such as voice, internet, IoT, or security services) based on the predictive recommendations.

In some implementations, one or more of the trained AI models 324 are selected for re-training based on the lift scores. The selected one or more of the trained AI models 324 can be re-trained by adjusting their parameters. For example, the system 300 implements a periodic AI model improvement cycle by selective retraining of the AI models 324 based on performance metrics. The lift scores 336 are analyzed across all the AI models 324 to identify which models require retraining. Models showing declining performance or lift scores below selectable thresholds are selected for recalibration. For example, if the voice service model's lift scores drop below 3.06 in top deciles for SMB segments, or if the fleet model's scores fall from the benchmark 8.46, those models are flagged for retraining. During retraining, the system 300 can adjust model parameters including feature importance weights and/or correlation thresholds. The voice model **324*a*** can have its feature weights recalibrated-adjusting the 23.3% importance weight for voice band size or 19.4% weight for add-a-line history based on updated network usage patterns and adoption data. The retraining process incorporates new telecommunications network data while maintaining the under-sampling approach to address the inherent data imbalances where positive adoption cases represent less than a small percentage.

In some implementations, the propensity scores 328 are periodically updated using the trained or re-trained AI models 324. For example, the system 300 periodically refreshes propensity scores 328 (e.g., on the 10th of each month, generating updated 30-day predictions). Such a periodic cycle enables regular evaluation of AI model performance through lift score calculations and initiates targeted retraining when needed. The refreshed propensity scores are again organized into deciles to maintain systematic performance tracking, with scores between 0-1 indicating service adoption likelihood. The disclosed methods help the AI models 324 remain current while adapting to evolving patterns in network usage and service adoption behavior.

Figure 4:
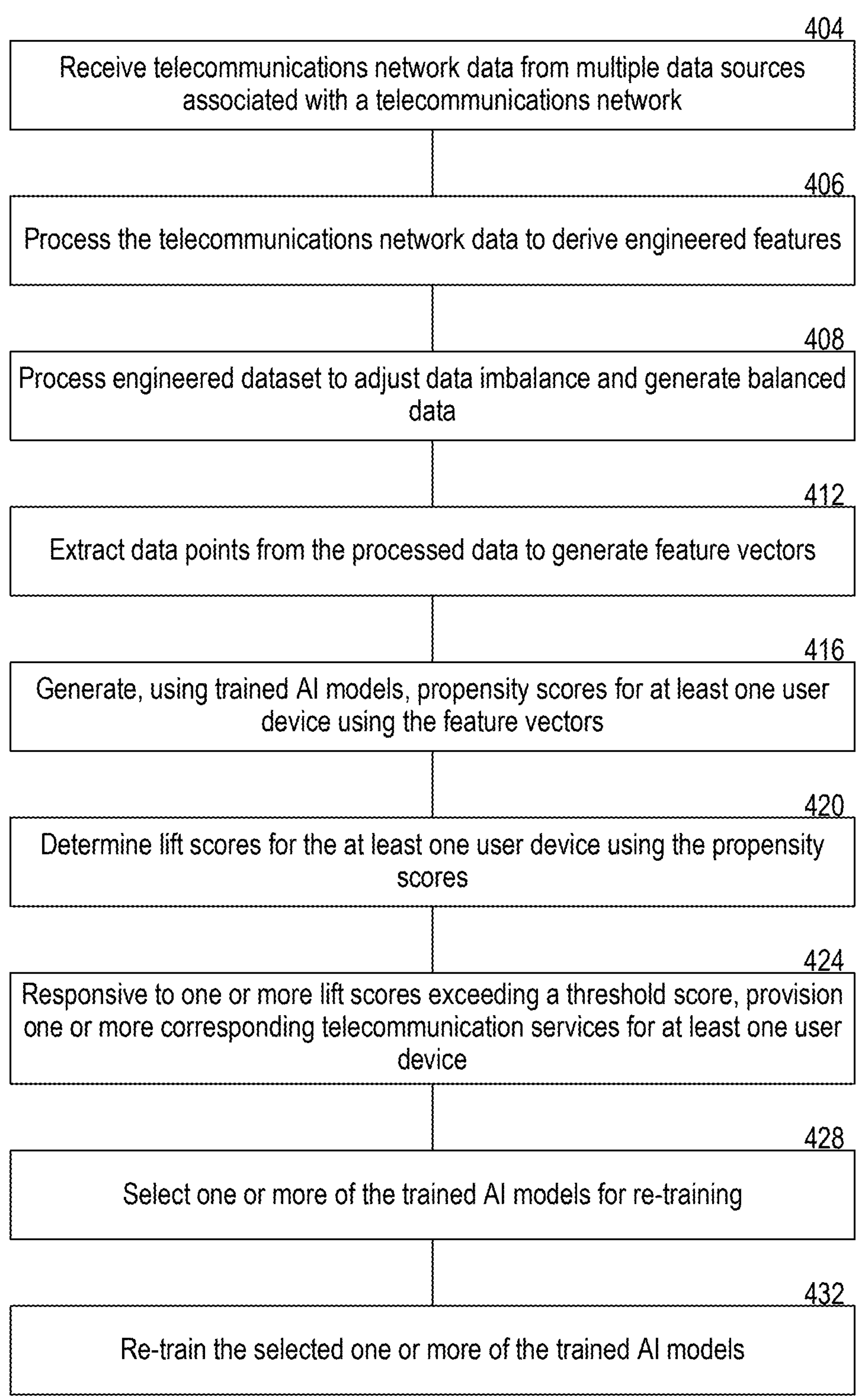
FIG. 4 is a flowchart that illustrates an example process for provisioning telecommunications services using machine learning.

FIG. 4 is a flowchart that illustrates an example process for provisioning telecommunications services using machine learning. In some implementations, the process is performed by the system 300 illustrated and described in more detail with reference to FIG. 3. In some implementations, the process is performed by a computer system, e.g., example computer system 600 illustrated and described in more detail with reference to FIG. 6. Particular entities, for example, the AI system 500 perform some or all of the steps of the process in other implementations. The AI system 500 is illustrated and described in more detail with reference to FIG. 5. Likewise, implementations can include different and/or additional steps or can perform the steps in different orders.

At 404, a computer system receives telecommunications network data from multiple data sources associated with a telecommunications network. The telecommunications network data is associated with at least one user device. The telecommunications network data can include data imbalances associated with multiple telecommunications services. The telecommunications services can include voice services, Internet services, beyond-the-smartphone devices, and/or Internet of Things (IoT) services. For example, raw telecommunications network data is ingested from multiple diverse sources including network experience metrics, customer satisfaction scores (NPS), network technology utilization data, voice and/or data usage patterns, transactional records, and/or device history information. The raw data encompasses network-level metrics such as total MB usage, average network experience scores, voice/data consumption patterns, and/or technology-specific metrics for LTE/5G networks. The computer system tracks both total MB usage and average MB usage as key network metrics for analyzing service utilization patterns. This includes monitoring network-specific metrics such as USG_NETWORK_DOWN_ON_NET_LTE_MB that measures data downloaded over LTE and/or USG_NETWORK_DOWN_ON_NET_5G_MB that measures data downloaded over 5G networks. The computer system uses these MB usage metrics as features to train and apply AI models to predict service adoption patterns.

The computer system can receive data from various segments including micro, small/medium entities, enterprise, and/or government sectors, collecting both structured metrics such as usage data and unstructured feedback. The raw data can include network parameters such as network download/upload metrics, technology utilization patterns, service activation records, and/or detailed network performance indicators that provide comprehensive visibility into service usage and experience across the telecommunications network. The raw data can contain significant inherent imbalances where positive adoption cases represent less than a small fraction (e.g., 2%) across different product/service categories.

At 406, the computer system processes the telecommunications network data to derive engineered features. For example, the computer system processes diverse telecommunications network data including transactional data, account information, customer feedback metrics, network usage data, and/or firmographic data. The computer system can perform feature engineering by extracting key data points such as voice band size, network experience metrics, usage patterns, and/or technology utilization data across LTE/5G networks to produce feature engineered and flattened data.

At 408, the computer system processes the feature engineered and flattened data and applies a combination of over- and/or under-sampling to adjust the data imbalances and generate balanced data. For example, the feature engineered and flattened data is processed by applying over- and/or under-sampling techniques to address the data imbalances. The computer system identifies the data imbalances where positive adoption cases represent less than a small proportion of total cases. The over-sampling is applied to the minority class (adoption cases) and under-sampling is applied to the majority class (non-adoption cases) to create balanced training datasets while preserving the important predictive signals in the data. The under-sampling reduces the number of negative cases to achieve a more balanced ratio with positive cases. The processed data maintains network metrics including experience scores, usage patterns, and/or technology utilization data while addressing the inherent imbalances. The balanced datasets enable more effective AI model training by preventing the AI models from being overwhelmed by the majority class of non-adoption cases.

At 412, the computer system extracts data points from the balanced data to generate multiple feature vectors. Each feature vector can correspond to a respective one of the telecommunications services. For example, feature engineering is performed to extract and determine relevant data points reflecting voice band size, network experience metrics, usage patterns, and/or technology utilization data across LTE/5G networks. The features can be weighted based on their predictive importance—for example, voice band size represents 23.3% importance for voice services, while network usage metrics and dedicated sales representative features carry different weights for other services. In some implementations, the computer system determines feature importance weights by analyzing how different features influence propensity scores across the AI classification models. For each AI model, normalized importance weights are determined that sum to 100%, quantifying each feature's relative predictive power. Multiple features are used to determine the weights.

At 416, the computer system generates, using multiple trained AI models, multiple propensity scores for the at least one user device using the feature vectors. Each of the trained AI models provides a respective one of the propensity scores. For example, multiple specialized binary classification models are used to generate the propensity scores, with each AI model focused on a specific service category: voice, Internet, beyond-the-smartphone devices, IoT, fleet management, multiline services, unified communications, and security services. Each AI model processes the engineered feature vectors containing weighted features. The AI models analyze the weighted features to generate normalized propensity scores between 0 and 1, where scores closer to 1 indicate higher likelihood of service adoption.

At 420, the computer system determines multiple lift scores for the at least one user device using the propensity scores. Each lift score corresponds to a respective one of the telecommunications services. For example, lift scores are determined by comparing propensity-based predictions against baseline response rates for each service category. For each model and customer segment, the computer system determines a baseline response rate by dividing the total number of positive adoption cases by the total number of cases. The computer system organizes propensity scores into deciles and determines lift scores for each decile by dividing the number of positive cases in that decile by the product of total cases and baseline rate. For example, voice models can achieve lift scores of 3.06 in top deciles for SMB segments, while fleet models can show lift scores of 8.46, indicating prediction accuracy 8.46 times better than random chance.

At 424, the computer system provisions one or more of the telecommunications services for the at least one user device in response to one or more of the lift scores exceeding a threshold score. The one or more of the telecommunications services correspond to the one or more of the lift scores. When lift scores exceed the threshold score (e.g., 1.0, 10, 100) indicating better-than-random prediction accuracy, the corresponding telecommunications services are identified for provisioning. For example, when voice models achieve lift scores of 3.06 in top deciles for SMB segments, voice service provisioning is enabled for those segments. The provisioning process can target user devices for enabling the identified services through the telecommunications network.

At 428, the computer system selects one or more of the trained AI models for re-training based on the lift scores. The selected one or more of the trained AI models 324 can be re-trained by adjusting their parameters. For example, the system 300 implements a periodic AI model improvement cycle by selective retraining of the AI models 324 based on performance metrics. The lift scores 336 are analyzed across all the AI models 324 to identify which models require retraining. Models showing declining performance or lift scores below selectable thresholds are selected for recalibration. For example, if the voice service model's lift scores drop below 3.06 in top deciles for SMB segments, or if the fleet model's scores fall from the benchmark 8.46, those models are flagged for retraining.

At 432, the computer system re-trains the selected one or more of the trained AI models by adjusting parameters of the selected one or more of the trained AI models. During retraining, the computer system can adjust model parameters including feature importance weights and/or correlation thresholds. For example, a voice model can have its feature weights recalibrated-adjusting the importance weight for voice band size or the weight for add-a-line history based on updated network usage patterns and adoption data. The retraining process incorporates new telecommunications network data while maintaining the under-sampling approach to address the inherent data imbalances where positive adoption cases represent less than a small percentage.

Figure 5:
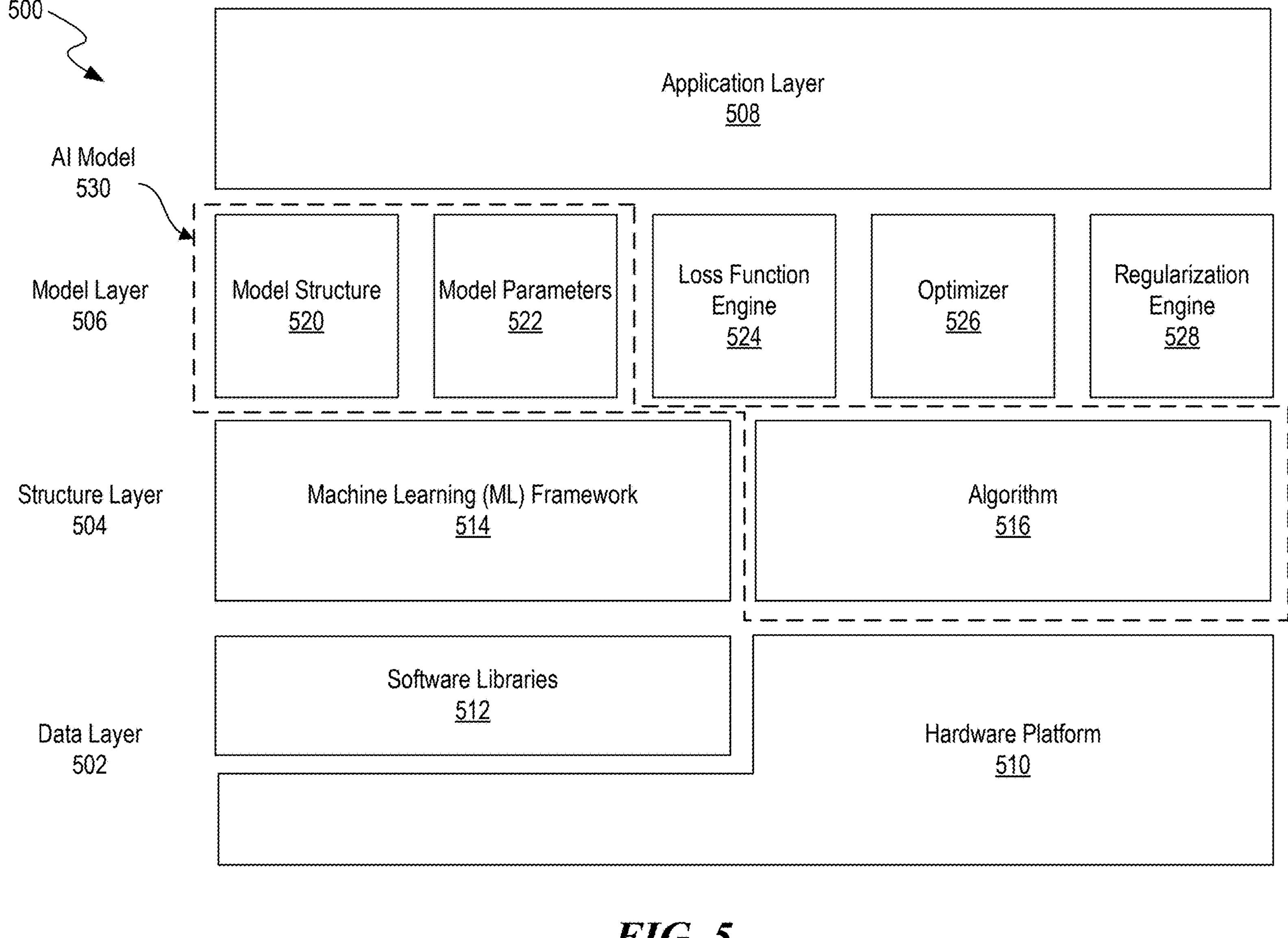
FIG. 5 is a block diagram that illustrates an example AI system that can implement aspects of the present technology.

FIG. 5 is a block diagram that illustrates an example AI system 500 that can implement aspects of the present technology. The AI system 500 is implemented using components of the example computer system 600 illustrated and described in more detail with reference to FIG. 6. For example, the AI system 500 can be implemented on the processor 602 using instructions 608 programmed in the memory 606 illustrated and described in more detail with reference to FIG. 6. Likewise, implementations of the AI system 500 can include different and/or additional components or be connected in different ways. FIG. 5 illustrates a layered architecture of AI system 500 that can be used to implement the system 300 of FIG. 3, in accordance with some implementations of the present technology.

As shown, the AI system 500 can include a set of layers, which conceptually organize elements within an example network topology for the AI system's architecture to implement a particular AI model 530. Generally, an AI model 530 is a computer-executable program implemented by the AI system 500 that analyses data to make predictions. Information can pass through each layer of the AI system 500 to generate outputs for the AI model 530. The layers can include a data layer 502, a structure layer 504, a model layer 506, and an application layer 508. The algorithm 516 of the structure layer 504 and the model structure 520 and model parameters 522 of the model layer 506 together form an example AI model 530. The optimizer 526, loss function engine 524, and regularization engine 528 work to refine and optimize the AI model 530, and the data layer 502 provides resources and support for application of the AI model 530 by the application layer 508.

The data layer 502 acts as the foundation of the AI system 500 by preparing data for the AI model 530. As shown, the data layer 502 can include two sub-layers: a hardware platform 510 (e.g., the computer system 600 described in more detail with reference to FIG. 6) and one or more software libraries 512. The hardware platform 510 can be designed to perform operations for the AI model 530 and include computing resources for storage, memory, logic and networking, such as the resources described in relation to FIG. 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model 530, application of the AI model 530, and training data for the AI model 530. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model 530. The ML framework 514 can include an open-source library, an application programming interface (API), a gradient-boosting library, an ensemble method, and/or a deep learning toolkit that work with the layers of the AI system facilitate development of the AI model 530. For example, the ML framework 514 can distribute processes for application or training of the AI model 530 across multiple resources in the hardware platform 510. The ML framework 514 can also include a set of pre-built components that have the functionality to implement and train the AI model 530 and allow users to use pre-built functions and classes to construct and train the AI model 530. Thus, the ML framework 514 can be used to facilitate data engineering, development, hyperparameter tuning, testing, and training for the AI model 530. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data (e.g., the raw data described in more detail with reference to FIG. 4) and create new/modified outputs based on what was learned.

In some implementations, the algorithm 516 can build the AI model 530 through being trained while running computing resources of the hardware platform 510. This training allows the algorithm 516 to make predictions or decisions without being explicitly programmed to do so. Once trained, the algorithm 516 can run at the computing resources as part of the AI model 530 to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from network elements of FIG. 2 and the like. In an example implementation, training data can include native-format data collected (e.g., in the form of raw content from a user device) from various source computing systems described in relation to FIG. 1. Furthermore, training data can include pre-processed data generated by various engines of the system 300 described in relation to FIG. 3. The user may label the training data based on one or more classes and trains the AI model 530 by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., network experience metrics and network usage data) relate to the categories (telecommunications services). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. A computer system can use unsupervised learning to identify patterns in digital history (e.g., to identify network experience metrics and network usage data) and so forth. In some implementations, performance of the AI models that can use unsupervised learning is improved because the incoming data from the network is pre-processed and reduced, based on the relevant context, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model 530 using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model 530 of the AI system 500. The model structure 520 defines the complexity of the pattern/relationship that the AI model 530 expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model 530 and the actual output of the AI model 530 and is used to guide optimization of the AI model 530 during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cos h loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model 530. Overfitting occurs when the algorithm 516 is overly complex and too adapted to the training data, which can result in poor performance of the AI model 530. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model 530 and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can be implemented on the system 300.

Computer System

Figure 6:
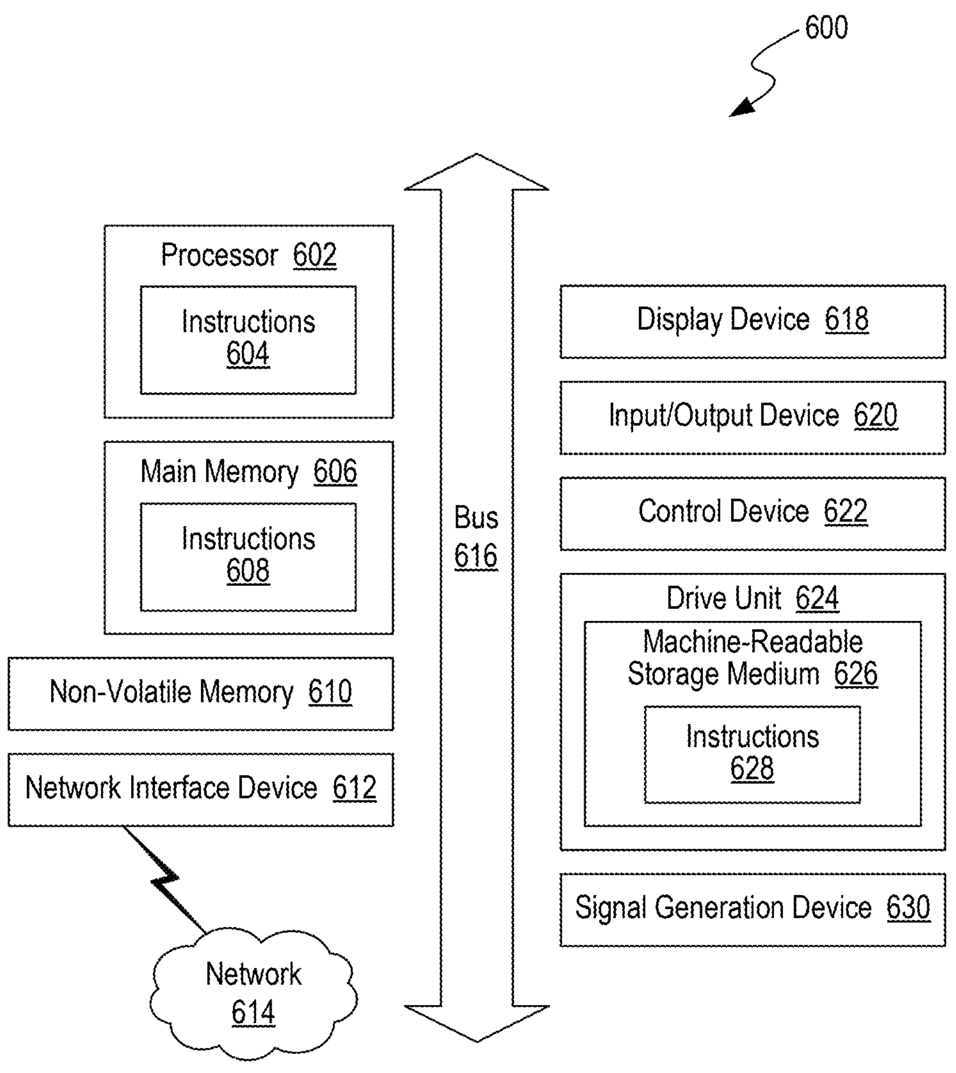
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system comprising:

at least one hardware processor; and at least one non-transitory memory storing instructions, which, when executed by the at least one hardware processor, cause the computer system to:

receive telecommunications network data from multiple data sources associated with a telecommunications network, wherein the telecommunications network data is associated with at least one user device, and wherein the telecommunications network data includes data imbalances associated with multiple telecommunications services;

process the telecommunications network data using under-sampling to adjust the data imbalances and generate processed data;

extract data points from the generated processed data to generate multiple feature vectors, each corresponding to a respective one of the telecommunications services;

generate, using multiple trained artificial intelligence (AI) models, multiple propensity scores for the at least one user device using the feature vectors, wherein each of the trained AI models provides a respective one of the propensity scores;

determine multiple lift scores for the at least one user device using the propensity scores, each lift score corresponding to a respective one of the telecommunications services;

responsive to one or more of the lift scores exceeding a threshold score, provision one or more of the telecommunications services for the at least one user device, wherein the one or more of the telecommunications services correspond to the one or more of the lift scores;

select one or more of the trained AI models for re-training based on the lift scores; and re-train the selected one or more of the trained AI models by adjusting parameters of the selected one or more of the trained AI models.

2. The computer system of claim 1, wherein the telecommunications services include at least one of voice services, Internet services, beyond-the-smartphone devices services, or Internet of Things (IoT) services.

3. The computer system of claim 1, wherein the computer system is caused to:

periodically update the propensity scores using the trained AI models; and organize the propensity scores into deciles for determining the lift scores.

4. The computer system of claim 1, wherein the telecommunications network data includes at least one of network experience metrics, network usage data, or network technology utilization metrics.

5. The computer system of claim 1, wherein the computer system is caused to generate the feature vectors by determining feature importance weights for features of the telecommunications services, wherein the feature importance weights indicate a relative impact of each feature on the propensity scores.

6. The computer system of claim 1, wherein the telecommunications services include at least one of multiline services, unified communications services, or security services.

7. A non-transitory computer-readable storage medium storing instructions, which, when executed by at least one processor of a computer system, cause the computer system to:

receive telecommunications network data from multiple data sources associated with a telecommunications network, wherein the telecommunications network data is associated with at least one user device, and wherein the telecommunications network data includes data imbalances associated with multiple telecommunications services;

process the telecommunications network data using under-sampling to adjust the data imbalances and generate processed data;

extract data points from the generated processed data to generate multiple feature vectors, each corresponding to a respective one of the multiple telecommunications services;

generate, using multiple trained artificial intelligence (AI) models, multiple propensity scores for the at least one user device using the feature vectors, wherein each of the trained AI models provides a respective one of the propensity scores;

determine multiple lift scores for the at least one user device using the propensity scores, each lift score corresponding to a respective one of the telecommunications services;

responsive to one or more of the lift scores exceeding a threshold score, provision one or more of the telecommunications services for the at least one user device, wherein the one or more of the telecommunications services correspond to the one or more of the lift scores;

select one or more of the trained AI models for re-training based on the lift scores; and re-train the selected one or more of the trained AI models by adjusting parameters of the selected one or more of the trained AI models.

8. The non-transitory computer-readable storage medium of claim 7, wherein the computer system is caused to:

periodically update the propensity scores using the trained AI models.

9. The non-transitory computer-readable storage medium of claim 7, wherein the telecommunications services include at least one of voice services, Internet services, beyond-the-smartphone devices services, or Internet of Things (IoT) services.

10. A method performed by a computer system, the method comprising:

receiving telecommunications network data from multiple data sources associated with a telecommunications network, wherein the telecommunications network data is associated with at least one user device, and wherein the telecommunications network data includes data imbalances associated with multiple telecommunications services;

processing the telecommunications network data using under-sampling to adjust the data imbalances and generate processed data;

extracting data points from the generated processed data to generate multiple feature vectors, each corresponding to a respective one of the multiple telecommunications services;

generating, using multiple trained artificial intelligence (AI) models, multiple propensity scores for the at least one user device using the feature vectors, wherein each of the trained AI models provides a respective one of the propensity scores;

determining multiple lift scores for the at least one user device using the propensity scores, each lift score corresponding to a respective one of the telecommunications services;

responsive to one or more of the lift scores exceeding a threshold score, provisioning one or more of the telecommunications services for the at least one user device, wherein the one or more of the telecommunications services correspond to the one or more of the lift scores;

selecting one or more of the trained AI models for re-training based on the lift scores; and re-training the selected one or more of the trained AI models by adjusting parameters of the selected one or more of the trained AI models.

11. The method of claim 10, wherein the telecommunications network data includes at least one of network experience metrics, network usage data, or network technology utilization metrics.

12. The method of claim 10, wherein the telecommunications services include at least one of voice services, Internet services, beyond-the-smartphone devices services, or Internet of Things (IoT) services.

* * * * *